(12) United States Patent
Shin et al.

(10) Patent No.: US 11,828,623 B2
(45) Date of Patent: Nov. 28, 2023

(54) STEERING APPARATUS

(71) Applicant: HL MANDO CORPORATION, Gyeonggi-do (KR)

(72) Inventors: Kyungsub Shin, Gyeonggi-do (KR); Han Sang Chae, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 38 days.

(21) Appl. No.: 17/743,437

(22) Filed: May 12, 2022

(65) Prior Publication Data

US 2022/0364884 A1 Nov. 17, 2022

(30) Foreign Application Priority Data

May 14, 2021 (KR) .......................... 10-2021-0062843

(51) Int. Cl.
*G01D 5/14* (2006.01)
*B62D 15/02* (2006.01)

(52) U.S. Cl.
CPC .............. *G01D 5/14* (2013.01); *B62D 15/021* (2013.01)

(58) Field of Classification Search
CPC ........ G01D 5/00; G01D 5/12; G01D 5/14–16; G01D 5/244–2458; B62D 15/02; B62D 15/021; B62D 15/0225
See application file for complete search history.

(56) References Cited

U.S. PATENT DOCUMENTS

| | | | | |
|---|---|---|---|---|
| 6,367,337 | B1* | 4/2002 | Schlabach | G01L 5/221 180/443 |
| 9,428,211 | B2* | 8/2016 | Vermeersch | B62D 1/19 |
| 2008/0047309 | A1* | 2/2008 | Okuno | B60R 25/02153 70/252 |
| 2008/0129285 | A1* | 6/2008 | Knecht | G01D 5/2013 324/207.21 |
| 2010/0179727 | A1* | 7/2010 | Luthje | G01D 5/34723 701/41 |
| 2018/0023980 | A1* | 1/2018 | Schoepe | G01D 5/2451 324/207.25 |

* cited by examiner

*Primary Examiner* — Huy Q Phan
*Assistant Examiner* — David B Frederiksen
(74) *Attorney, Agent, or Firm* — Ladas & Parry, LLP (57) ABSTRACT

The present embodiments provide a steering apparatus including a sliding shaft that is built into a shaft housing and linearly moves in the axial direction, a shaft coupling member coupled to an outer circumferential surface of the sliding shaft and axially sliding together with the sliding shaft inside the shaft housing, a magnet coupling member having a built-in magnet inside, coupled to the shaft coupling member, and axially sliding together with the sliding shaft inside the shaft housing, a sliding support member fixed to the shaft housing and slidably coupled to the magnet coupling member at a lower end thereof, and a sensor member coupled to the sliding support member and to which a sensor for detecting a magnetic field change of the magnet and a circuit board are mounted.

20 Claims, 11 Drawing Sheets

STEERING APPARATUS

CROSS REFERENCE TO RELATED APPLICATION

This application claims priority from Korean Patent Application No. 10-2021-0062843, filed on May 14, 2021, which is hereby incorporated by reference for all purposes as if fully set forth herein.

TECHNICAL FIELD

The present embodiments relate to a steering apparatus, and more particularly, to a steering apparatus capable of maintaining high durability even after durability in which a steering angle measurement accuracy is increased and shock and vibration are transmitted from a road surface.

RELATED ART

In general, a steering apparatus for a vehicle is equipped with a hydraulic device, a motor, a speed reducer, and the like to steer the wheels of the vehicle according to the driving condition of the vehicle. It is common to operate on the front wheels of a car or the front and rear wheels of a steer-by-wire system.

The axial movement of the sliding shaft in the automobile steering system is measured by a sensor that detects the movement of the magnet, and the sensor measures the displacement of an object that reciprocates in a straight line, and the electronic control device stably controls the rotation of the vehicle based on this.

However, the conventional vehicle steering apparatus has a problem in that the measurement precision of the steering angle is deteriorated because the axial displacement change of the sliding shaft cannot be accurately measured due to the mounting structure of the magnet, the sensor, and the surrounding parts.

In addition, after the durability in which shocks and vibrations are transmitted from the road surface during driving of the vehicle, the precision of the measurement of the steering angle is sharply lowered, and research is being conducted to improve the durability.

DETAILED DESCRIPTION OF THE INVENTION

Technical Problem

The present embodiments have been conceived in the above-described relate art, aiming to provide a steering apparatus that can improve the durability by accurately measuring the change in the axial displacement of the sliding shaft to increase the precision of the measurement of the steering angle, and to maintain the precision of the measurement of the steering angle even after the durability of transmission of shock and vibration from the road surface.

Technical Solution

The present embodiments provide a steering apparatus including a sliding shaft that is built into a shaft housing and linearly moves in the axial direction, a shaft coupling member coupled to an outer circumferential surface of the sliding shaft and axially sliding together with the sliding shaft inside the shaft housing, a magnet coupling member having a built-in magnet inside, coupled to the shaft coupling member, and axially sliding together with the sliding shaft inside the shaft housing, a sliding support member fixed to the shaft housing and slidably coupled to the magnet coupling member at a lower end thereof, and a sensor member coupled to the sliding support member and to which a sensor for detecting a magnetic field change of the magnet and a circuit board are mounted.

Advantageous Effects

According to the present embodiments, there is provided a steering apparatus that can improve the durability by accurately measuring the change in the axial displacement of the sliding shaft to increase the precision of the measurement of the steering angle, and to maintain the precision of the measurement of the steering angle even after the durability of transmission of shock and vibration from the road surface.

MODE FOR CARRYING OUT THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
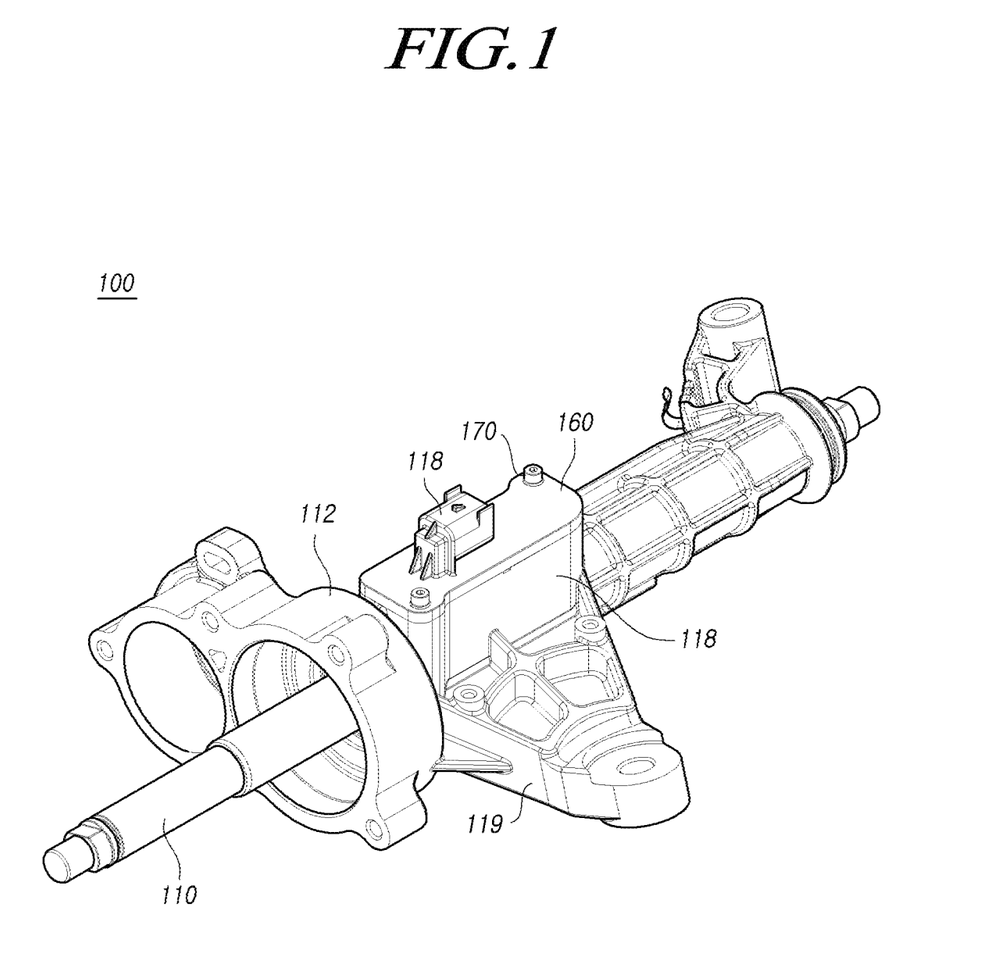
FIG. 1 is a perspective view showing a steering apparatus according to the present embodiments.
Figure 2:
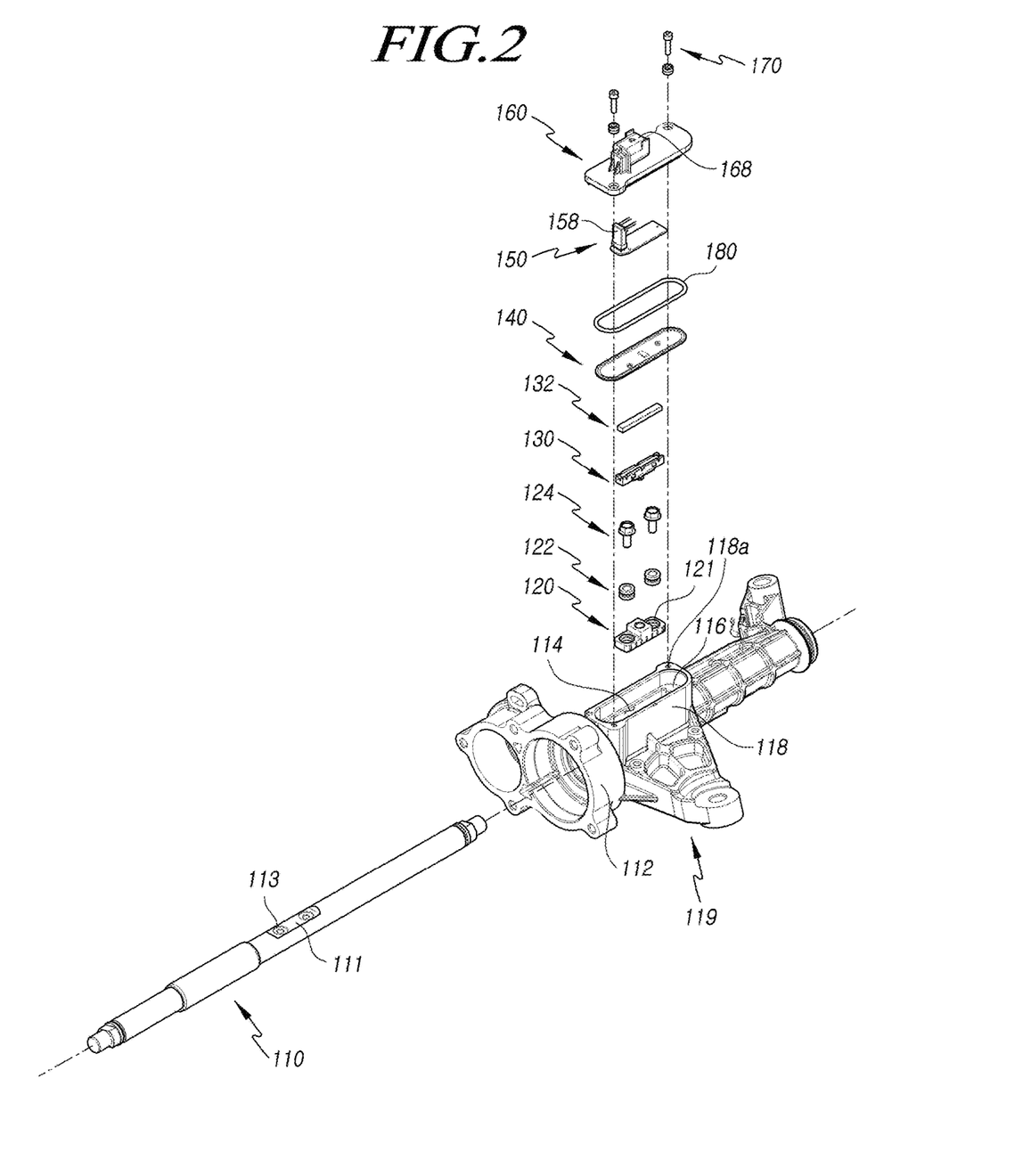
FIG. 2 is an exploded perspective view of FIG. 1.
Figure 3:
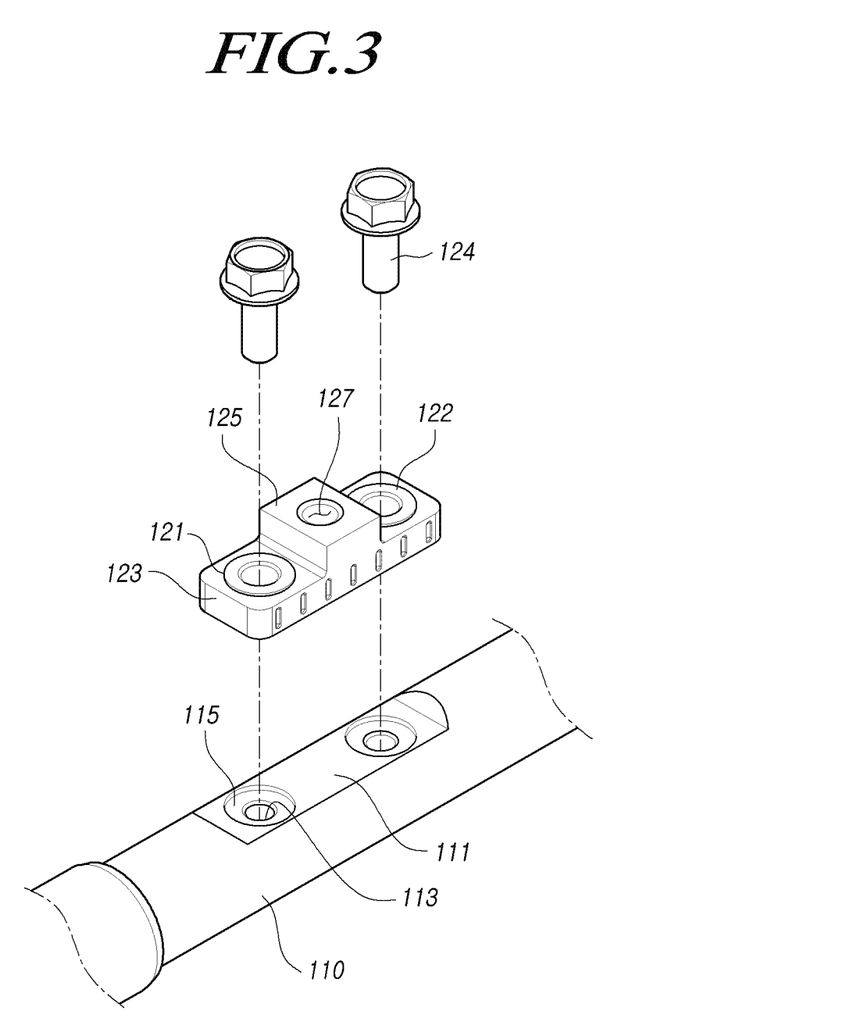
FIG. 3 is a exploded perspective view showing a part of the FIG. 2.
Figure 4:
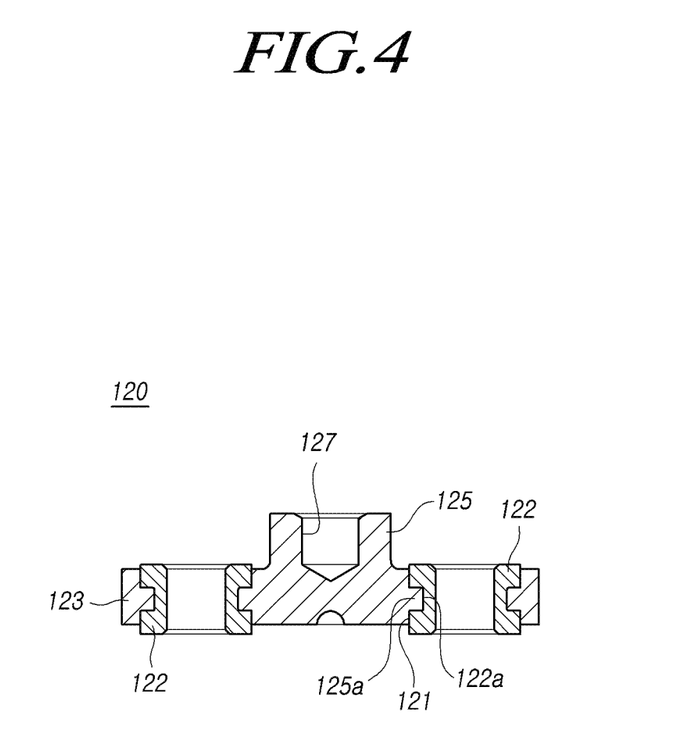
FIG. 4 is a cross-sectional view showing a part of the FIG. 2.
Figure 5:
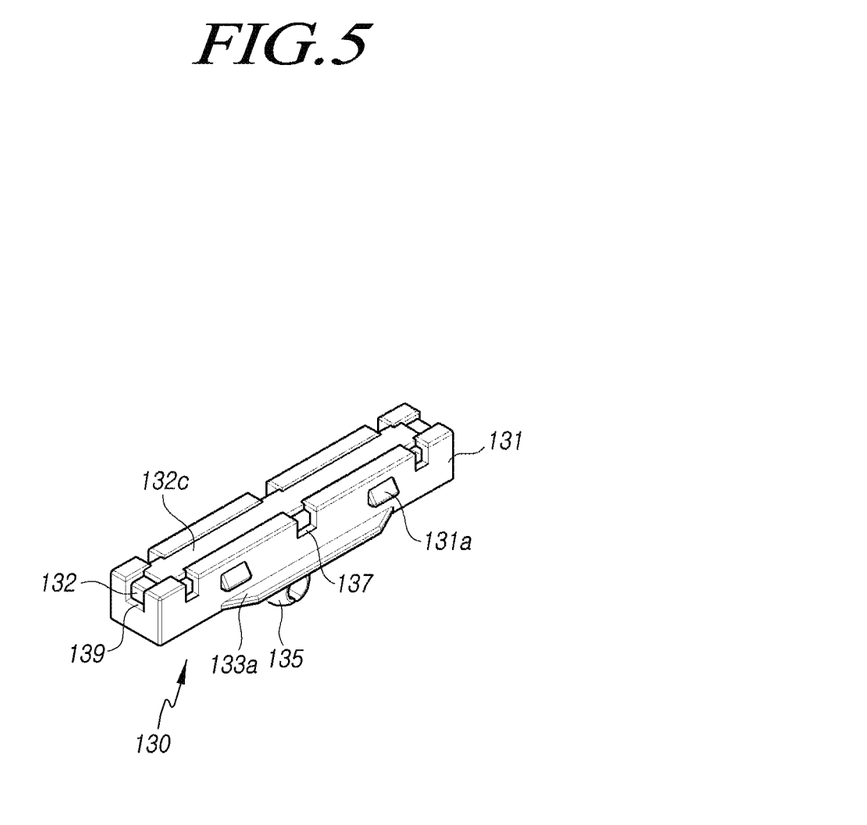
FIGS. 5 to 9 are perspective views showing some of the steering apparatus according to the present embodiments.
Figure 6:
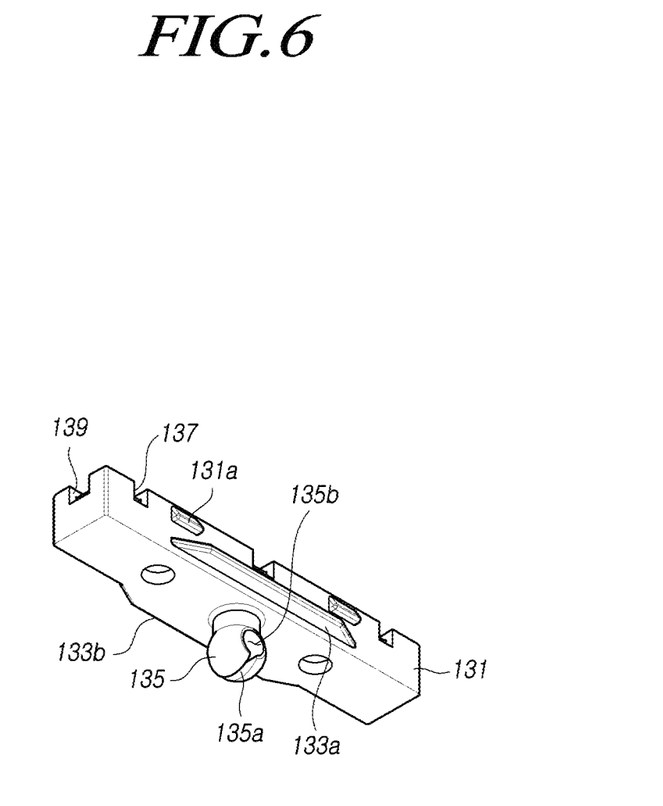
Figure 7:
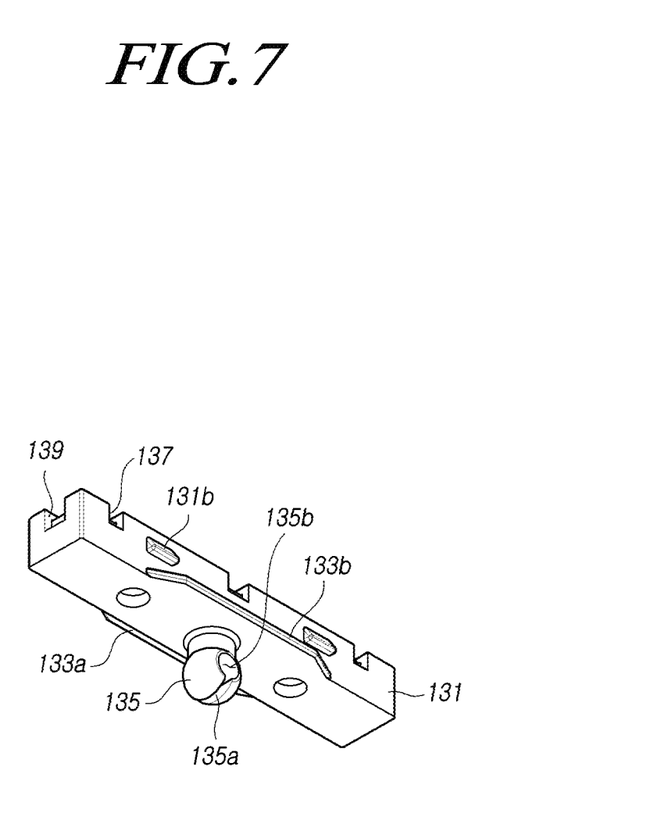
Figure 8:
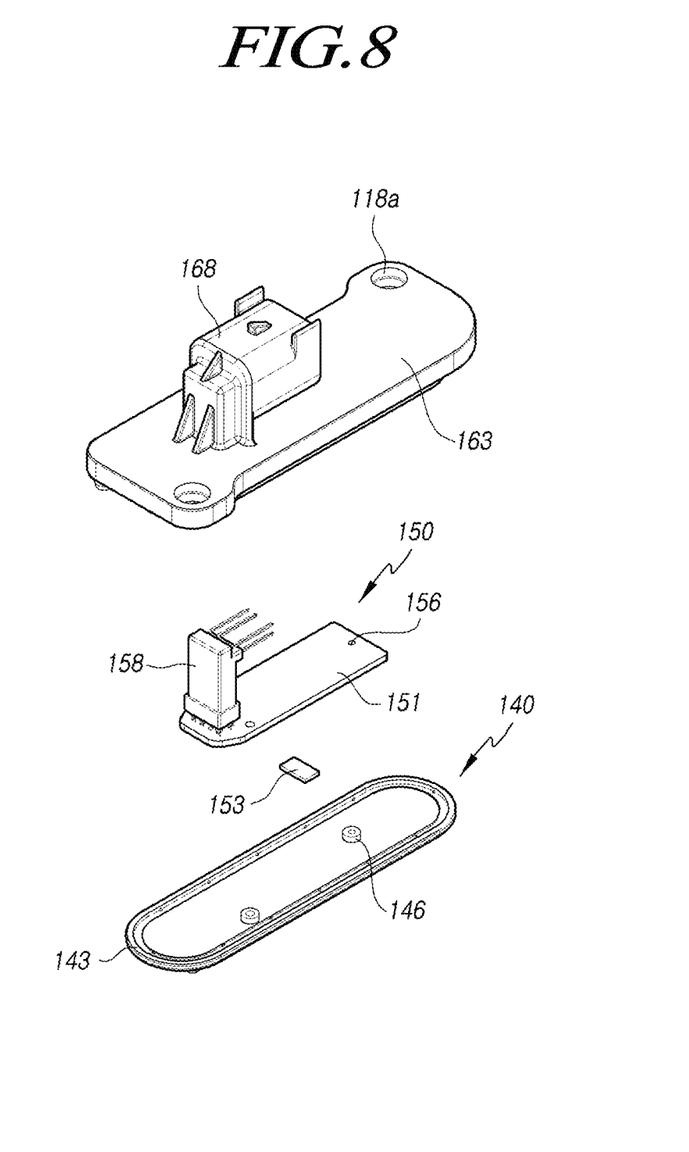
Figure 9:
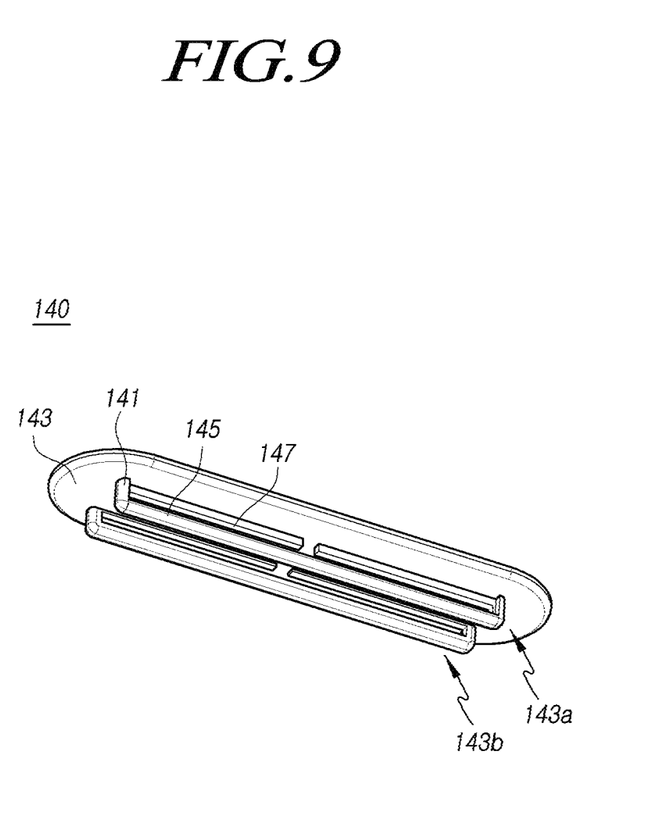
Figure 10:
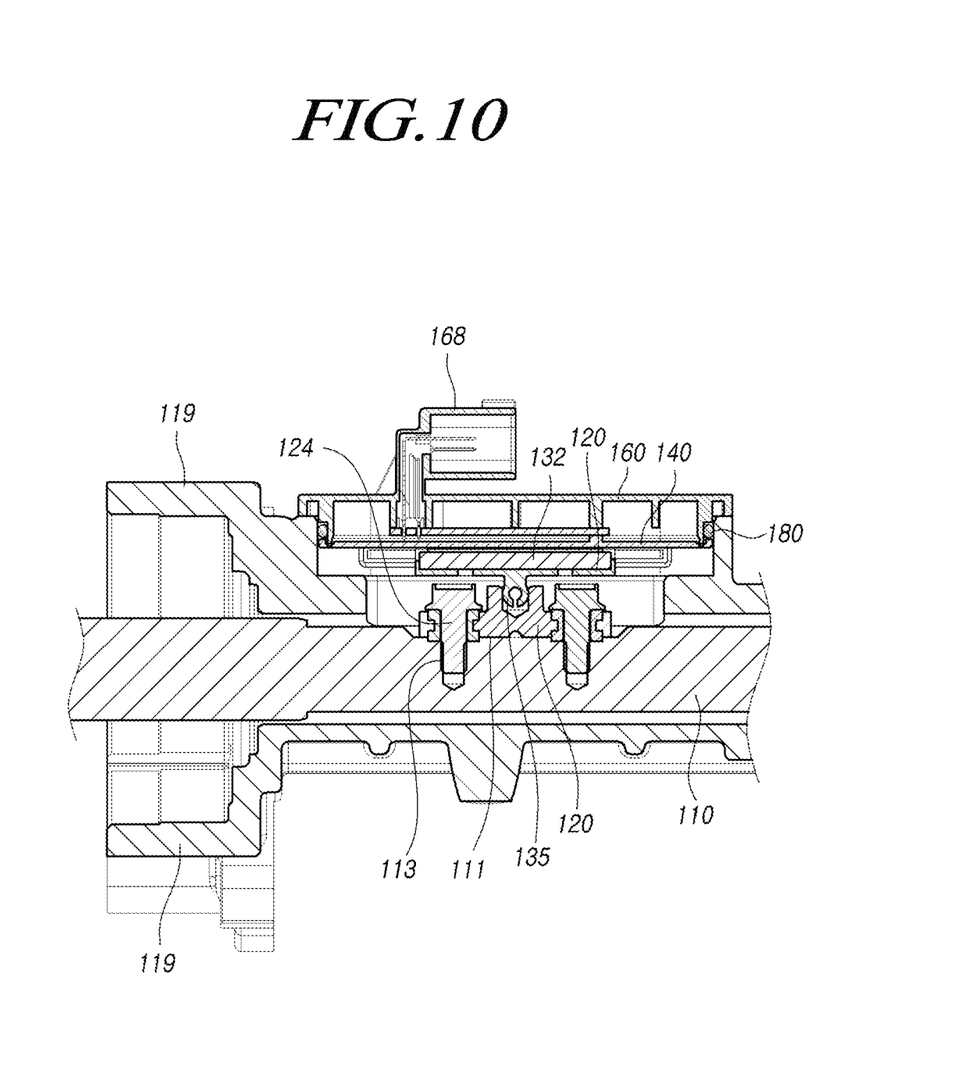
FIGS. 10 and 11 are cross-sectional views showing some of the steering apparatus according to the present embodiments.
Figure 11:
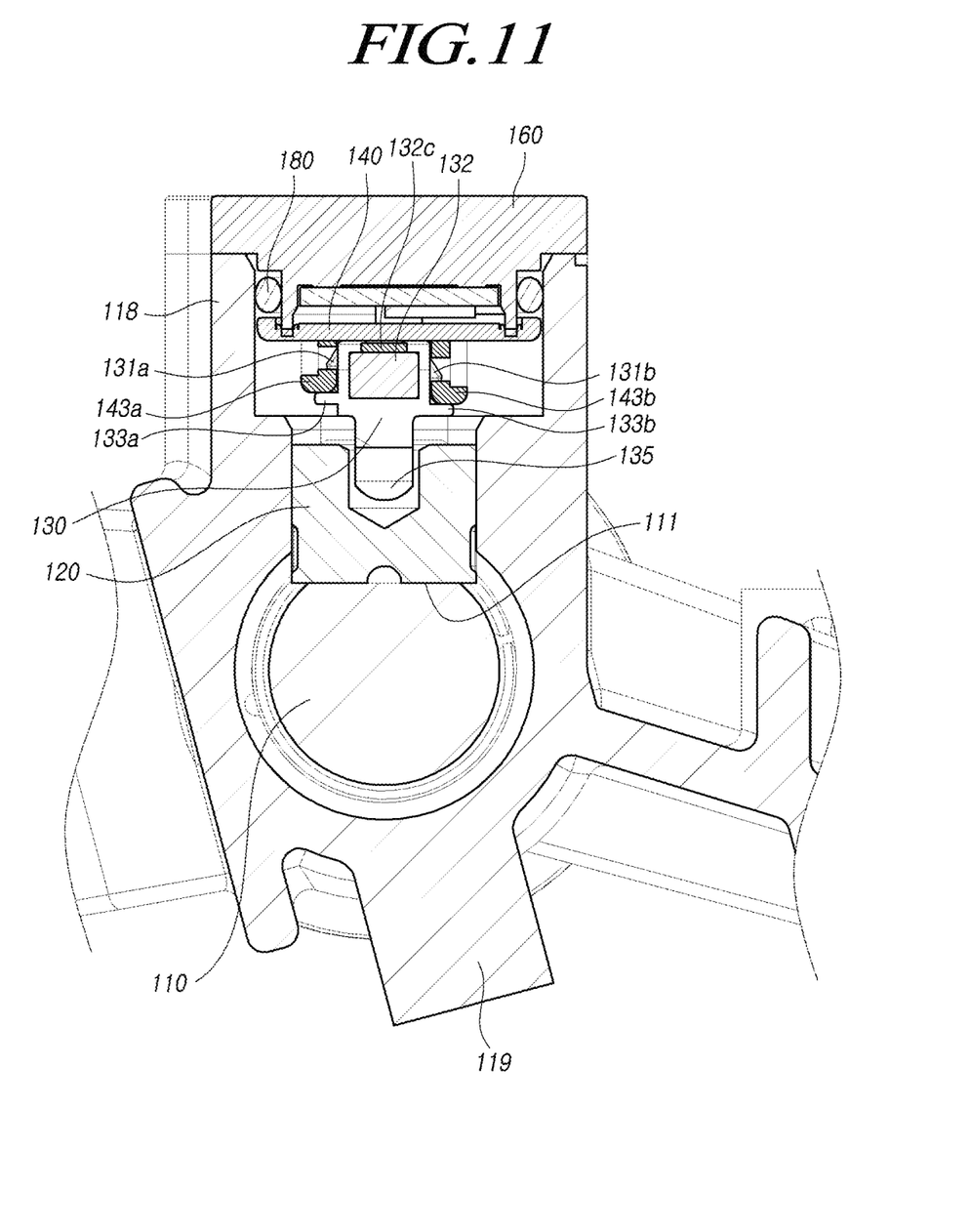

FIG. 1 is a perspective view showing a steering apparatus according to the present embodiments, FIG. 2 is an exploded perspective view of FIG. 1, FIG. 3 is a exploded perspective view showing apart of the FIG. 2, FIG. 4 is a cross-sectional view showing a part of the FIG. 2, FIGS. 5 to 9 are perspective views showing some of the steering apparatus according to the present embodiments, FIGS. 10 and 11 are cross-sectional views showing some of the steering apparatus according to the present embodiments.

As illustrated in FIGS. 1 to 11, a steering apparatus 100 according to the present embodiments includes a sliding shaft 110 that is built into a shaft housing 119 and linearly moves in the axial direction, a shaft coupling member 120 coupled to an outer circumferential surface of the sliding shaft 110 and axially sliding together with the sliding shaft 110 inside the shaft housing 119, a magnet coupling member 130 having a built-in magnet 132 inside, coupled to the shaft coupling member 120, and axially sliding together with the sliding shaft 110 inside the shaft housing 119, a sliding support member 140 fixed to the shaft housing 119 and slidably coupled to the magnet coupling member 130 at a lower end thereof, and a sensor member 150 coupled to the sliding support member 140 and to which a sensor 153 for detecting a magnetic field change of the magnet 132 and a circuit board 151 are mounted.

The steering apparatus 100 according to the present embodiments performs steering of the vehicle while the sliding shaft 110 linearly moves in the axial direction, and the sensor member 150 detects a change in the magnetic field of the magnet 132 that linearly moves together with the sliding shaft 110 and transmits a change in displacement in the axial direction to an electronic control device to calculate a steering angle.

The sliding shaft 110 is built into the shaft housing 119 and linearly moves in the axial direction, and the shaft coupling member 120 is coupled to the sliding shaft 110 and slides in the axial direction together with the sliding shaft 110 inside the shaft housing 119.

The sliding shaft 110 is screwed with a ball nut and moves in the axial direction through a belt that transmits the driving force of the motor, and the electronic control device can control the driving of the motor by calculating the steering angle through the change in the magnetic field of the magnet 132 sensed by the sensor member 150.

A motor, a belt, a ball nut, etc. are embedded in the mounting part 112 of the driving unit formed on one side of the shaft housing 119, and detailed descriptions of these parts will be omitted.

A flat seating surface 111 is formed on the outer circumferential surface of the sliding shaft 110, so that the shaft coupling member 120 is seated on the seating surface 111 of the sliding shaft 110 and is coupled to the coupling member 124.

In addition, fixing holes 113 spaced apart from each other in the axial direction are formed on the seating surface 111 of the sliding shaft 110, and a communication hole 121 communicating with the fixing hole 113 is formed in the shaft coupling member 120 so that the coupling member 124 is coupled to the fixing hole 113 and the communication hole 121.

And, the insert member 122 may be integrally molded with the shaft coupling member 120 in the communication hole 121 of the shaft coupling member 120 to be coupled to the coupling member 124.

Here, the locking protrusion 122a formed by being recessed in a stepped manner is formed on the outer peripheral surface of the insert member 122, and on the inner peripheral surface of the communication hole 121 of the shaft coupling member 120, a protruding end 125a protruding inward to be inserted into the engaging projection 122a of the insert member 122 is formed.

And, a support groove 115 in which the insert member 122 is inserted and supported is formed around the fixing hole 113 of the seating surface 111, so that when the shaft coupling member 120 and the sliding shaft 110 are coupled, the insert member 122 is supported by the support groove 115 and the fixing position is accurate.

The magnet coupling member 130 is supported and coupled to the shaft coupling member 120, and a magnet 132 is embedded inside the magnet coupling member 130. Accordingly, the sensor 153 detects a change in the magnetic field generated during the axial linear motion of the sliding shaft 110 to detect a change in the axial displacement of the sliding shaft 110.

That is, the shaft coupling member 120 is formed with a support end 125 that protrudes upwardly in the center of the upper surface of the main body 123 into which the insert member 122 is inserted, and a support hole 127 is formed in the support end 125 so that the insertion support 135 of the magnet coupling member 130 to be described later is inserted and supported in the support hole 127.

An insert groove 139 opened in the longitudinal direction of the sliding shaft 110 is formed at the upper end of the magnet coupling member 130, so that the magnet 132 is inserted into the insert groove 139.

In addition, the magnet 132 maybe inserted into the insert groove 139 to be integrally molded with the magnet coupling member 130, and a connection member 132c connected to both sides of the magnet coupling member 130 may be integrally molded on the upper side of the magnet 132.

Side grooves 137 communicating with the insert groove 139 are formed on both upper side surfaces of the magnet coupling member 130, and the side grooves 137 are axially spaced apart and provided with two or more. Accordingly, the exact position of the magnet 132 can be confirmed when integrally molding with the magnet coupling member 130.

And, in the center of the lower side of the magnet coupling member 130, the insertion support 135 is formed to protrude. An empty space 135b is provided on the inside of the insertion support part 135, the outer peripheral surface of the insertion support part 135 is formed in a spherical shape, and a slot 135a is formed on one side to communicate with the empty space 135b inside.

When the insertion support 135 is inserted into the support hole 127 of the shaft coupling member 120, the insertion support part 135 is inserted in contact with the inner circumferential surface of the support hole 127 in the axial direction and spaced apart from the inner circumferential surface of the support hole 127 in both directions.

On the other hand, since the magnet coupling member 130 is slidably coupled to the sliding support member 140 fixed to the shaft housing 119, the magnet coupling member 130 is supported so as not to swing to either side during linear motion in the axial direction together with the sliding shaft 110.

That is, guide protrusions 131a and 131b are protruded from both sides of the magnet coupling member 130, and guide rails 143a and 143b to which the guide protrusions 131a and 131b of the magnet coupling member 130 are inserted and slide are formed on the lower surface of the sliding support member 140. Accordingly, the guide protrusions 131a and 131b support the linear motion in the axial direction along the guide rails 143a and 143b.

The guide protrusions 131a and 131b have a lower side protruding perpendicular to the side surface of the magnet coupling member 130, and the amount of protrusion decreases as the side surface goes upward, and are formed as a tapered surface in contact with the side surface of the magnet coupling member 130.

The guide protrusions 131a and 131b include a first guide protrusion 131a formed on one side of both side surfaces of the magnet coupling member 130 and a second guide protrusion 131b formed on the other side surface of the magnet coupling member 130. The first guide protrusion 131a and the second guide protrusion 131b are provided at positions having different heights from the lower surface of the magnet coupling member 130.

In addition, the guide rails 143a and 143b include a first guide rail 143a into which the first guide protrusions 131a are inserted and slid on both sides of the lower side of the sliding support member 140, a second guide rail 143b into which the second guide protrusion 131b is inserted and slid.

The first guide rail 143a and the second guide rail 143b include a stopper portion 141 that protrudes downward from the lower surface of the sliding support member 140 and extends, a guide portion 145 that connects the stopper portion 141 and is formed in the axial direction, and an opening 147 supported when the first guide protrusion 131a and the second guide protrusion 131b are inserted and slid.

In addition, a first guide flange 133a supported by a lower surface of the first guide rail 143a is formed in the magnet coupling member 130 at a position spaced apart from the lower side of the first guide protrusion 131a. Accordingly, when the first guide protrusion 131a is inserted into the opening of the first guide rail 143a and slides, the first guide flange 133a slides in the axial direction while supporting the lower surface of the first guide rail 143a.

In addition, a second guide flange 133b supported on the lower surface of the second guide rail 143b is formed in the magnet coupling member 130 at a position spaced apart from the lower side of the second guide protrusion 131b. Accordingly, when the second guide protrusion 131b is inserted into the opening of the second guide rail 143b and slides, the second guide flange 133b supports the lower surface of the second guide rail 143b and slides in the axial direction.

And, one of the first guide flange 133a and the second guide flange 133b is formed extending in the lateral direction from the lower side of the magnet coupling member 130 and the other is formed spaced apart upward along the side from the lower side of the magnet coupling member 130.

The sensor member 150 provided with the sensor 153 and the circuit board 151 on which the sensor 153 is mounted is coupled to the sliding support member 140, and when the magnet coupling member 130 moves in the axial direction of the magnet 132, the sensor member 150 detects a change in the magnetic field of the magnet 132 when the magnet coupling member 130 moves in the axial direction.

The sensor member 150 is coupled to the upper surface of the sliding support member 140, and is coupled to the fastening part 146 provided in the sliding support member 140 and the fastening hole 156 of the circuit board 151 as a coupling member.

The housing cover 160 for sealing the upper side of the sensor member 150 and the shaft housing 119 is coupled to the fastening hole 118a formed at the upper end of the mounting part 118 of the shaft housing 119 as a coupling member 170, and the sensor member 150 is protected.

That is, the shaft housing 119 is formed with a mounting portion 118 protruding in the shape of a box provided with a space inside, and a support surface 116 on which the body 143 of the sliding support member 140 is supported is formed inside the mounting part 118.

And the magnet coupling member 130 and the shaft coupling member 120 are mounted to the lower space 114 of the support surface 116.

A sealing member 180 is coupled between the housing cover 160 and the shaft housing 119 to prevent the inflow of foreign substances from the outside.

On the other hand, one side of the sensor member 150 is provided with a binding terminal 158 for electrically connecting to the electronic control device, and the housing cover 160 is provided with a terminal cover 168 in which the binding terminal 158 is incorporated.

The terminal cover 168 may be integrally molded to the housing cover 160 to be formed.

According to the present embodiments, there is provided a steering apparatus that can improve the durability by accurately measuring the change in the axial displacement of the sliding shaft to increase the precision of the measurement of the steering angle, and to maintain the precision of the measurement of the steering angle even after the durability of transmission of shock and vibration from the road surface.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steering apparatus, comprising:
   a sliding shaft that is built into a shaft housing and linearly moves in the axial direction;
   a shaft coupling member coupled to an outer circumferential surface of the sliding shaft and axially sliding together with the sliding shaft inside the shaft housing;
   a magnet coupling member having a built-in magnet inside, coupled to the shaft coupling member, and axially sliding together with the sliding shaft inside the shaft housing;
   a sliding support member fixed to the shaft housing and slidably coupled to the magnet coupling member at a lower end thereof; and
   a sensor member coupled to the sliding support member and to which a sensor for detecting a magnetic field change of the magnet and a circuit board are mounted.

2. The steering apparatus of claim 1, wherein a flat seating surface is formed on the outer circumferential surface of the sliding shaft, and the shaft coupling member is seated on the seating surface and coupled to a coupling member.

3. The steering apparatus of claim 2, wherein a fixing hole spaced apart in the axial direction is formed on the flat seating surface of the sliding shaft, and a communication hole communicating with the fixing hole is formed in the shaft coupling member, and a coupling member is coupled to the fixing hole and the communication hole.

4. The steering apparatus of claim 2, wherein a fixing hole spaced apart in the axial direction is formed on the flat seating surface of the sliding shaft, and a communication hole communicating with the fixing hole is formed in the shaft coupling member, and an insert member is integrally molded with the shaft coupling member in the communication hole and is coupled to the coupling member.

5. The steering apparatus of claim 4, wherein a support groove in which the insert member is inserted and supported is formed around the fixing hole of the sliding shaft.

6. The steering apparatus of claim 4, wherein the insert member has a stepped recessed engaging protrusion on its outer circumferential surface, and an inner circumferential surface of the communication hole of the shaft coupling member has a protruding end protruding inwardly to be inserted into the engaging protrusion.

7. The steering apparatus of claim 1, wherein an upper end of the magnet coupling member is opened and an insert groove opened in the longitudinal direction of the sliding shaft is formed so that the magnet is inserted into the insert groove.

8. The steering apparatus of claim 1, wherein the magnet coupling member has an upper end opened and an insert groove opened in the longitudinal direction of the sliding shaft is formed, the magnet is inserted into the insert groove, and is integrally molded with the magnet coupling member and embedded therein.

9. The steering apparatus of claim 8, wherein an insertion support portion is formed to protrude from a center of a lower surface of the magnet coupling member, and a support end extending to protrude upward is formed in a center of a upper surface of the shaft coupling member, and a support hole through which the insertion support part is inserted and supported is formed in the support end.

10. The steering apparatus of claim 8, wherein two or more side grooves communicating with the insert groove are formed on both upper side surfaces of the magnet coupling member, and the side grooves are axially spaced apart from each other.

11. The steering apparatus of claim 7, wherein guide protrusions are formed protruding from both sides of the magnet coupling member, and guide rails are formed on a lower side of the sliding support member by inserting the guide protrusions to slide.

12. The steering apparatus of claim 11, wherein a lower surface of the guide protrusions is formed as a tapered surface that protrudes perpendicularly to a side surface of the magnet coupling member and the amount of protrusion decreases toward a upper side.

13. The steering apparatus of claim 11, wherein the guide protrusions include a first guide protrusion formed on one side of both side surfaces of the magnet coupling member and a second guide protrusion formed on the other side surface, and the first guide protrusion and the second guide protrusion are provided at positions having different heights from a lower surface of the magnet coupling member.

14. The steering apparatus of claim 13, wherein the guide rails include a first guide rail into which the first guide protrusion is inserted and slid on both sides of the lower side of the sliding support member and a second guide rail into which the second guide protrusion is inserted and slid.

15. The steering apparatus of claim 14, wherein the first guide rail and the second guide rail include a stopper portion protruding downward from the lower surface of the sliding support member, a guide portion connecting the stopper portion, and an opening into which the first guide projection and the second guide projection are inserted.

16. The steering apparatus of claim 15, wherein a first guide flange supported on a lower surface of the first guide rail is formed in the magnet coupling member at a position spaced apart from the lower side of the first guide protrusion.

17. The steering apparatus of claim 16, wherein a second guide flange supported by a lower surface of the second guide rail is formed in the magnet coupling member at a position spaced apart from the lower side of the second guide protrusion.

18. The steering apparatus of claim 17, wherein one of the first guide flange and the second guide flange is formed to extend in the lateral direction from the lower surface of the magnet coupling member, and the other is formed to be spaced apart upward along the side surface from the lower surface of the magnet coupling member.

19. The steering apparatus of claim 1, wherein the sensor member is coupled to an upper surface of the sliding support member, and a housing cover sealing the upper side of the sensor member and the shaft housing is coupled to and fixed to the shaft housing.

20. The steering apparatus of claim 19, wherein a binding terminal for electrically connecting to the electronic control device is provided on one side of the sensor member, and a terminal cover for embedding the binding terminal is provided on the housing cover.

* * * * *